US010756410B2

(12) United States Patent
Abraham et al.

(10) Patent No.: US 10,756,410 B2
(45) Date of Patent: Aug. 25, 2020

(54) COAXIAL TRANSMISSION LINE SLOT FILTER WITH ABSORPTIVE MATRIX

(71) Applicant: International Business Machines Corporation, Armonk, NY (US)

(72) Inventors: David W. Abraham, Cronton on Hudson, NY (US); Antonio D. Corcoles Gonzalez, Mount Kisco, NY (US); James R. Rozen, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 15/811,089

(22) Filed: Nov. 13, 2017

(65) Prior Publication Data

US 2018/0069289 A1    Mar. 8, 2018

Related U.S. Application Data

(62) Division of application No. 14/748,501, filed on Jun. 24, 2015, now Pat. No. 9,847,568, which is a division
(Continued)

(51) Int. Cl.
*H01P 11/00* (2006.01)
*H01P 1/202* (2006.01)
(Continued)

(52) U.S. Cl.
CPC ............ *H01P 11/007* (2013.01); *B29C 39/10* (2013.01); *H01P 1/202* (2013.01); *H01P 3/06* (2013.01);
(Continued)

(58) Field of Classification Search
CPC ...... H01P 11/007; H01P 11/005; H01P 1/202; B29C 39/10; Y10T 29/49018
(Continued)

(56) References Cited

U.S. PATENT DOCUMENTS 3,292,117 A   12/1966 Bryant et al.
3,492,604 A   1/1970 Fan
(Continued)

FOREIGN PATENT DOCUMENTS

CN  102751633 A   10/2012
JP  S6148442 A    3/1986
JP  H06275345 A   9/1994

OTHER PUBLICATIONS

"The Engineering ToolBox" that have been archived by the "Wayback machine", [online], Jan. 3, 2011, [May 11, 2016 search ], Internet<http://web.archive.org/web/20110103081744/http://www.engineeringtoolbox.com/thermal-conductivity-d_429.html> 4 pages.
(Continued)

*Primary Examiner* — Peter Dungba Vo
*Assistant Examiner* — Azm A Parvez
(74) *Attorney, Agent, or Firm* — Cantor Colburn LLP; Vazken Alexanian

(57) ABSTRACT

A filter is provided and includes potting material formed into a body defining a through-hole. The body includes first and second opposing faces and a sidewall extending between the first and second opposing faces. The sidewall is formed to define first and second openings at opposite ends of the through-hole, first angles at an interface between the sidewall and the first face and second angles, which complement the first angles, at an interface between the sidewall and the second face.

19 Claims, 8 Drawing Sheets

Related U.S. Application Data of application No. 13/837,606, filed on Mar. 15, 2013, now Pat. No. 9,300,029.

(51) Int. Cl.
*H01P 3/06* (2006.01)
*B29C 39/10* (2006.01)

(52) U.S. Cl.
CPC ....... *H01P 11/005* (2013.01); *Y10T 29/49018* (2015.01)

(58) Field of Classification Search
USPC ...... 29/601, 600, 592.1, 828, 841, 832, 829, 29/825
See application file for complete search history.

(56) References Cited

U.S. PATENT DOCUMENTS

| | | | |
|---|---|---|---|
| 3,638,147 A | 1/1972 | Denes | |
| 3,778,535 A | 12/1973 | Forney | |
| 3,909,759 A | 9/1975 | Ouellette et al. | |
| 4,035,054 A | 7/1977 | Lattanzi | |
| 4,366,457 A | 12/1982 | Bode | |
| 4,551,693 A | 11/1985 | Guidevaux | |
| 4,625,187 A | 11/1986 | Bocher | |
| 4,662,703 A | 5/1987 | Forney, Jr. et al. | |
| 4,712,296 A | 12/1987 | Forney, Jr. et al. | |
| 4,917,630 A | 4/1990 | Hubbard | |
| 5,367,956 A | 11/1994 | Fogle, Jr. | |
| 5,499,935 A | 3/1996 | Powell | |
| 5,509,827 A | 4/1996 | Huppenthal | |
| 5,730,623 A | 3/1998 | Krantz | |
| 5,796,323 A | 8/1998 | Uchikoba et al. | |
| 6,595,802 B1 | 7/2003 | Watanabe et al. | |
| 6,621,373 B1 | 9/2003 | Muyllen et al. | |
| 6,882,242 B2 | 4/2005 | Nelson | |
| 7,456,702 B2 | 11/2008 | Keefe et al. | |
| 7,478,475 B2 | 1/2009 | Hall | |
| 7,532,099 B2 | 5/2009 | Brunner | |
| 8,063,307 B2 | 11/2011 | Bukshpun et al. | |
| 2001/0002117 A1 | 5/2001 | Schulze-Buxloh | |
| 2002/0084710 A1 | 7/2002 | Worley | |
| 2002/0171172 A1* | 11/2002 | Lowell | B01D 63/00 264/265 |
| 2003/0030514 A1 | 2/2003 | Suma | |
| 2005/0073818 A1* | 4/2005 | Hirano | H01G 4/40 361/763 |
| 2009/0085694 A1 | 4/2009 | Keefe et al. | |
| 2011/0152104 A1 | 6/2011 | Farinelli et al. | |
| 2011/0201232 A1 | 8/2011 | Islam | |
| 2013/0016022 A1 | 1/2013 | Heiks et al. | |

OTHER PUBLICATIONS

A. Lukashenko et al., "Improved powder filters for qubit measurements," Review of Scientific Instruments, vol. 79, Issue 1, 2008, 014701, 4 pages.

D. F. Santavicca et al., "Impedance-matched low-pass stripline filters," Measurement Science and Technology, vol. 19, No. 8, 2008, 087001, 5 pages.

D. H. Slichter et al., "Millikelvin thermal and electrical performance of lossy transmission line filters." Applied Physics Letters, vol. 94, No. 19, 2009, 192508, 4 pages.

International Search Report issued in PCT/US2014/012239 dated May 12, 2014; 7 pages.

K. Bladh et al., "Comparison of cryogenic filters for use in single electronics experiments," Review of Scientific Instruments, vol. 74, Issue 3, 2003, 1540721, 5 pages.

R. C. Richardson and E. N. Smith (Eds.), "Experimental techniques in condensed matter physics at low temperatures," 1988, Addison-Wesley, Redwood City, CA, pp. 236-239.

Written Opinion t issued in PCT/US2014/012239 dated May 12, 2014; 7 pages.

UK Examination dated Mar. 29, 2016.

\* cited by examiner

COAXIAL TRANSMISSION LINE SLOT FILTER WITH ABSORPTIVE MATRIX

DOMESTIC BENEFIT/NATIONAL STAGE INFORMATION

This application is a divisional application of U.S. application Ser. No. 14/748,501, was filed on Jun. 24, 2015 which is a divisional of U.S. application Ser. No. 13/837,606, which was filed on Mar. 15, 2013 and patented on Mar. 29, 2016 with U.S. Pat. No. 9,300,029. The entire disclosures of U.S. application Ser. No. 14/748,501 and 13/837,606 are incorporated herein by reference.

STATEMENT OF GOVERNMENT INTEREST

This invention was made with Government support under Contract No.: W911NF-10-1-0324 awarded by Army Research Office (ARO). The Government has certain rights in this invention.

BACKGROUND

The present invention relates to a coaxial transmission line filter and, more particularly, to a coaxial transmission line slot filter with an absorptive matrix.

Microwave circuits often rely on filters in order to isolate signals from noise sources, or from other portions of the circuit. These filters are often bulky and require extra hardware in addition to the wiring and structures already in place for the circuits in use. In some cases, the filters are not widely tunable in either frequency cutoff or attenuation. Further, the filters may or may not be low-temperature compatible. Finally, the filter cost may be high due to the special hardware required to implement the design.

SUMMARY

According to one embodiment of the present invention, a filter is provided and includes potting material formed into a body defining a through-hole. The body includes first and second opposing faces and a sidewall extending between the first and second opposing faces. The sidewall is formed to define first and second openings at opposite ends of the through-hole, first angles at an interface between the sidewall and the first face and second angles, which complement the first angles, at an interface between the sidewall and the second face.

According to another embodiment of the invention, a filter is provided for a coaxial cable including an outer sheath having one or more slits formed therein exposing a dielectric spacer between the outer sheath and an inner conductor. The filter includes potting material formed into a body about the outer sheath. The potting material contacts the exposed dielectric spacer via the one or more slits. The body defines a through-hole through which the coaxial cable extends and includes first and second opposing faces on opposite sides of the coaxial cable and a sidewall extending between the first and second opposing faces. The sidewall is formed to define first and second openings for the coaxial cable, first angles at an interface between the sidewall and the first face and second angles, which complement the first angles, at an interface between the sidewall and the second face.

According to another embodiment of the invention, a filtered coaxial cable is provided and includes an inner conductor, an outer sheath having one or more slits formed therein, a dielectric spacer between the inner conductor and the outer sheath, portions of the dielectric spacer being exposed by the one or more slits and potting material formed into a body about the outer sheath such that the potting material contacts the portions of the dielectric spacer exposed by the one or more slits.

According to another embodiment of the invention, a method of forming a filter is provided for a coaxial cable including an outer sheath having one or more slits formed therein exposing a dielectric spacer between the outer sheath and an inner conductor. The method includes forming a mold with an opening, attaching the coaxial cable to the mold such that the coaxial cable extends through the opening and pouring potting material into the opening and curing the potting material. The forming of the mold includes shaping the opening such that the potting material is formable into a body about the outer sheath such that the potting material contacts the exposed dielectric spacer via the one or more slits.

According to yet another embodiment of the invention, a method of forming a filtered coaxial cable including an inner conductor, an outer sheath and a dielectric spacer disposed between the inner conductor and the outer sheath is provided. The method includes forming one or more slits in the outer sheath, assembling a mold with an opening, disposing the coaxial cable on the mold such that the coaxial cable is suspended in the opening, pouring potting material into the opening and curing the potting material such that the cured potting material contacts portions of the dielectric spacer exposed by the one or more slits and removing the coaxial cable from the mold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The description provided herein relates to a filter (e.g., a radio frequency (RF) filter) that is based on a standard coaxial cable structure. The cable's outer sheath is slotted longitudinally to expose a dielectric spacer between the outer sheath and the center conductor, and the resultant opening is potted in epoxy in which ferromagnetic particles are embedded. This filter is relatively inexpensive in that it uses only the existing cable used in the apparatus plus some inexpensive epoxy, tunable by an adjustment of the ferromagnetic particle content and/or the dimensions and number of slots, is cryogenic compatible and is compact as compared to other solutions. The filter removes high frequency components from the signal line yet presents a nearly constant impedance to lower frequency signals, which are passed by the device. The rejection band characteristics for this filter have the desirable property that attenuation increases with increasing frequency with no reduction in attenuation up to (and possibly above) about 65 GHz. This is an unusual and desirable property especially in view of the fact that most other low-pass filters show increasing attenuation up to some frequency, but then above that frequency the attenuation actually decreases.

Figure 1:
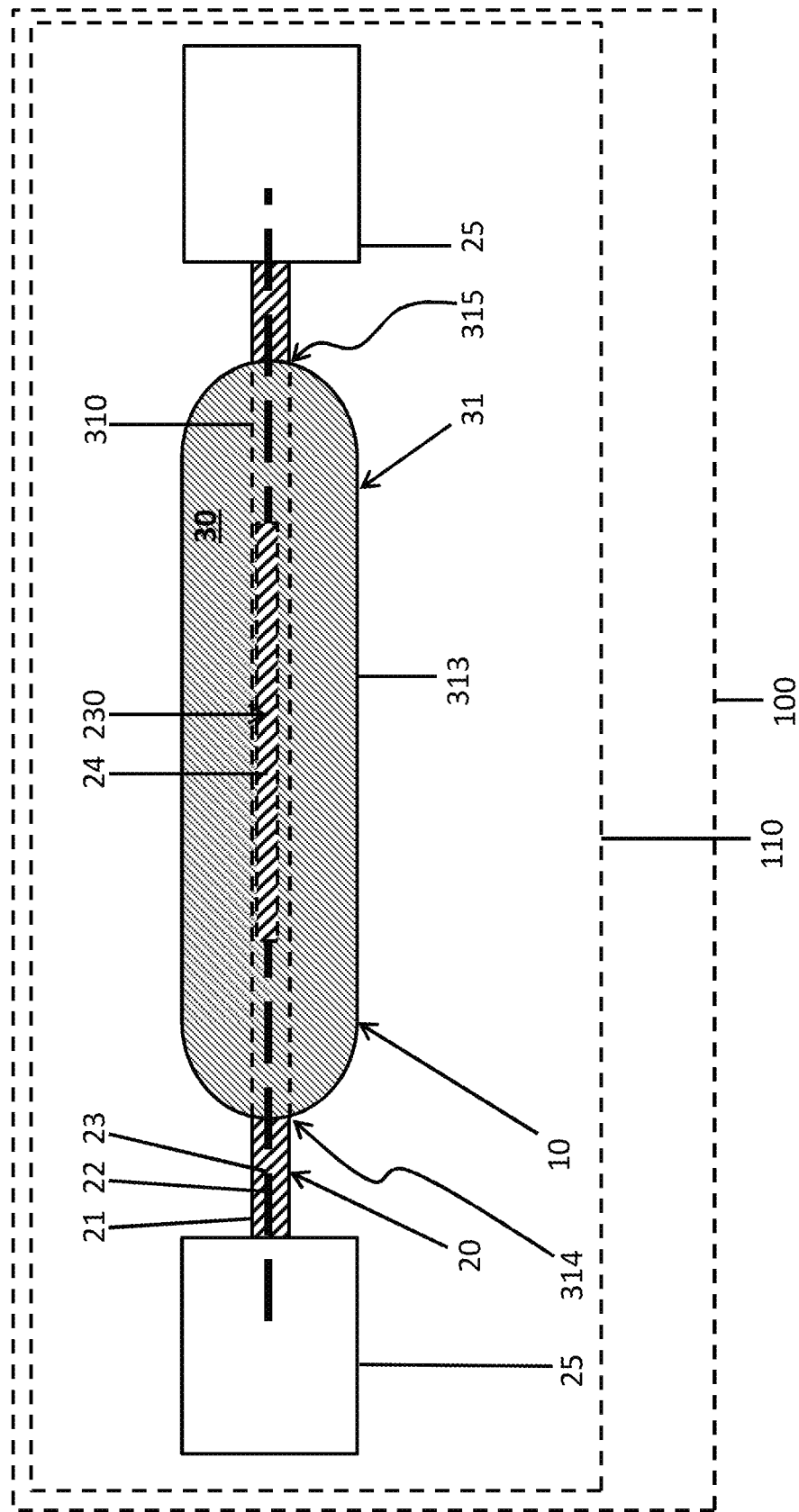
FIG. 1 is a plan view of a filter in accordance with embodiments.
Figure 2:
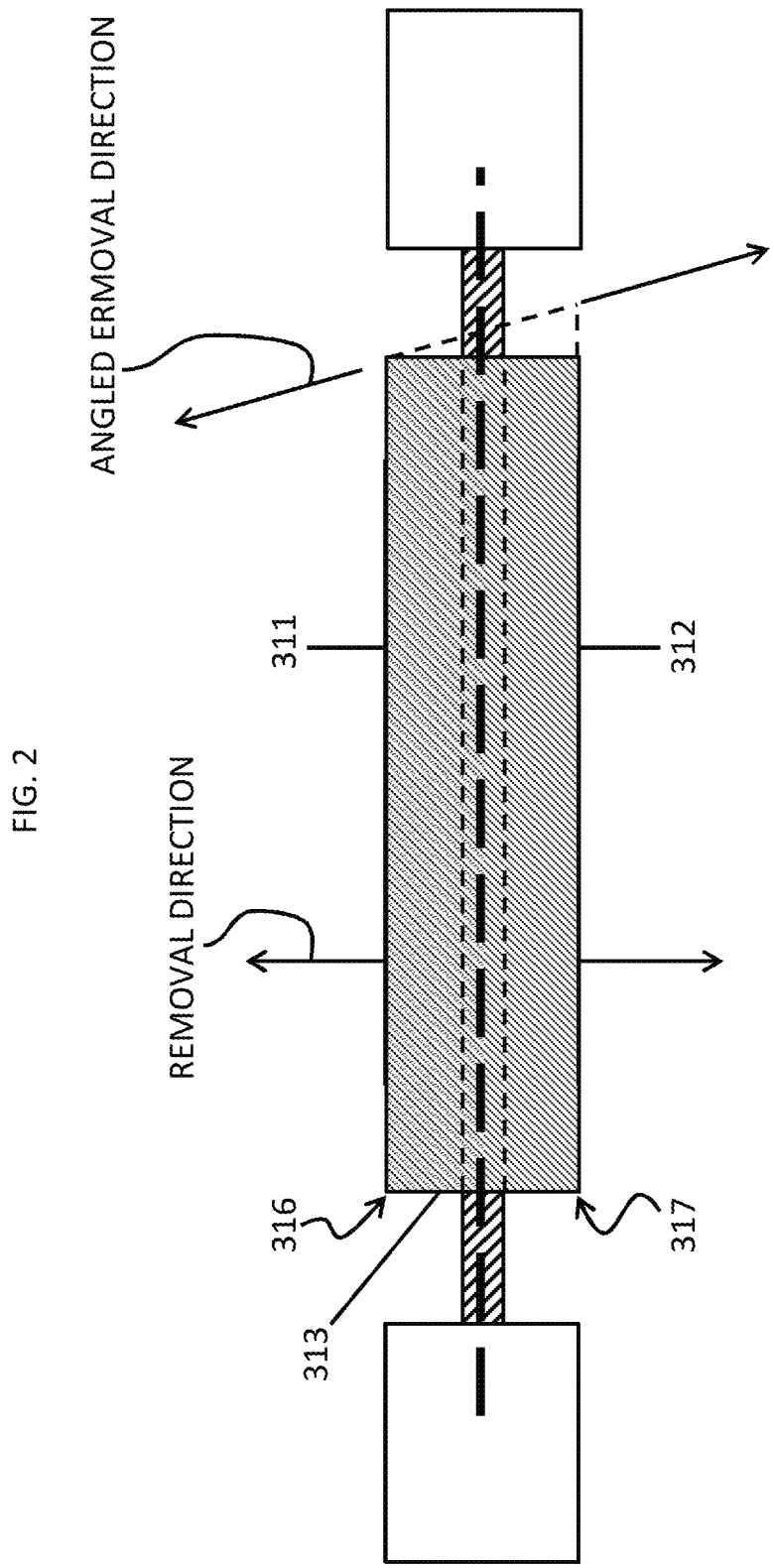
FIG. 2 is a side view of the filter of FIG. 1.
Figure 3:
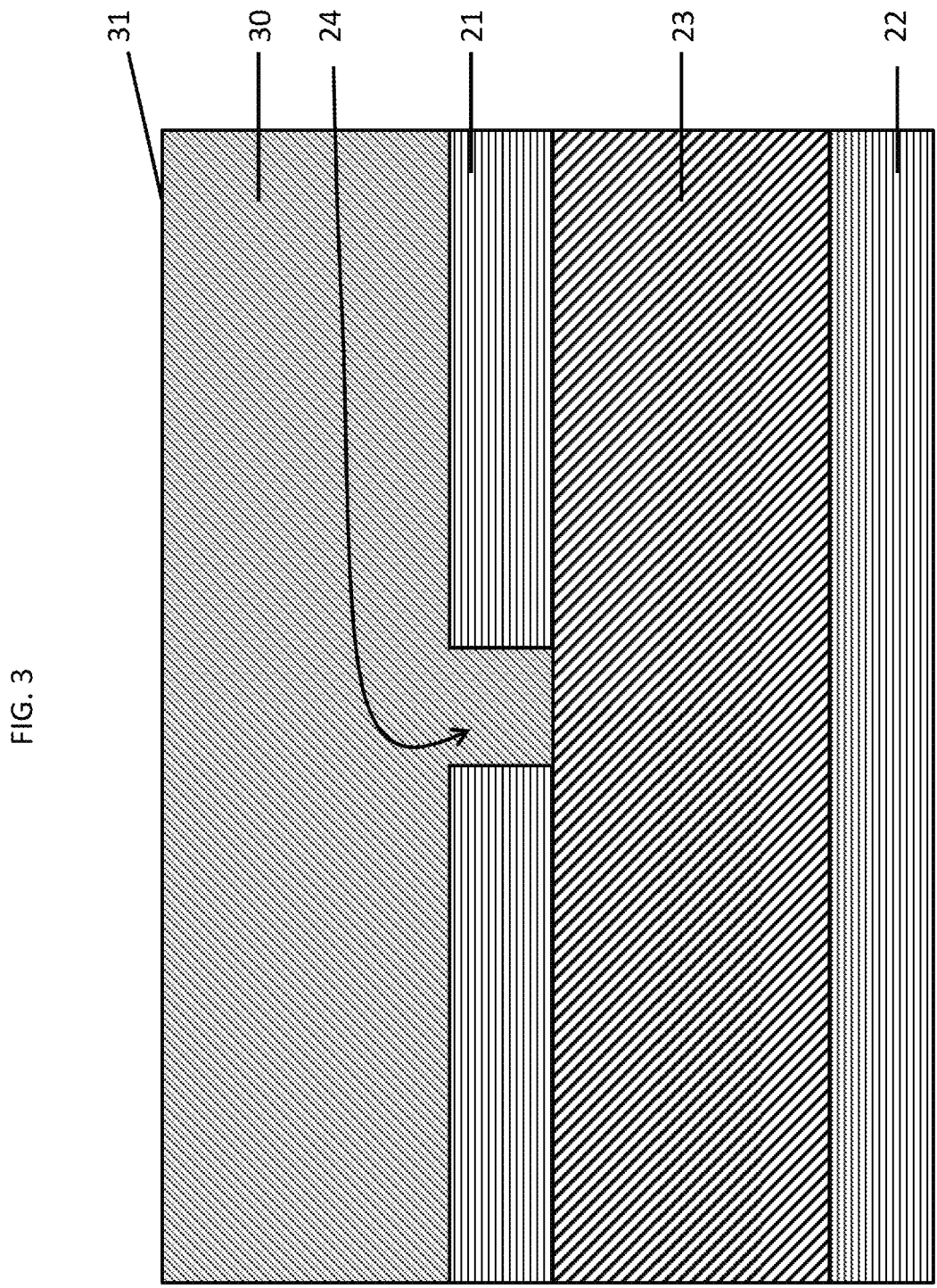
FIG. 3 is an enlarged partial side view of the filter of FIG. 1.

With reference to FIGS. 1-3, a filter 10 is provided for use in various applications such as those associated with a coaxial cable 20. The coaxial cable 20 includes a conductive outer sheath 21, an inner conductor 22 and a dielectric spacer 23 operably disposed between the outer sheath 21 and the inner conductor 22 to insulate the outer sheath 21 and the inner conductor 22 from one another. The outer sheath 21 has one or more slits 24 formed therein, which expose portions 230 of the dielectric spacer 23. The slits 24 do not extend around an entire circumference of the outer sheath 21 such that the outer sheath 21 is a continuous element. The slits 24 may have similar shapes and sizes or varied shapes and sizes. The coaxial cable 20 may further include connectors 25 at opposite axial ends thereof that will generally have larger diameters than the outer sheath 21. The filter 10 further includes potting material 30 that is formed into a body 31 disposed about the outer sheath 21 such that the potting material 30 contacts the exposed portions 230 of the dielectric spacer 23 via the slits 24 (see FIG. 3 and, for further embodiments, FIG. 6).

The body 31 is formed to define a through-hole 310 through which the coaxial cable 20 extends in a longitudinal dimension. The body 31 includes first and second opposing faces 311 and 312 on opposite sides of the coaxial cable 20 and a sidewall 313 that extends between the first and second opposing faces 311, 312. The sidewall 313 is formed to define first and second openings 314 and 315 for the coaxial cable 20 to enter and exit the through-hole 310, first angles 316 and second angles 317. The first angles 316 are defined at an interface between the sidewall 313 and the first face 311. The second angles 317 complement the first angles 316 and are defined at an interface between the sidewall 313 and the second face 312.

In accordance with embodiments, the first and second faces 311 and 312 may be substantially planar and, in accordance with further embodiments, the first and second faces 311 and 312 may be substantially parallel with one another. In general, however, it is not necessary for the first and second faces 311 and 312 to have any particular characteristic planarity and need not be parallel with one another. As shown in FIG. 1, the first and second faces 311 and 312 may be substantially oblong with rounded or semi-circular ends and parallel sides. The first and second angles 316 and 317 are complementary with one another at corresponding portions of the first and second faces 311 and 312. That is, the first angle 316 formed at a first given point of a periphery of the first face 311 complements the second angle formed at a second point of the periphery of the second face 312 that corresponds (i.e., in terms of its distance to the ends of the body 31) to the first given point. In some cases, the first and second angles 316 and 317 will be right angles. However, embodiments could exist in which the first angles 316 are obtuse and the second angles 317 are correspondingly acute and vice versa.

The potting material 30 may include an absorptive epoxy material 300 (see FIG. 5) and ferromagnetic particles. In accordance with embodiments, the absorptive epoxy includes Eccosorb™.

Figure 4:
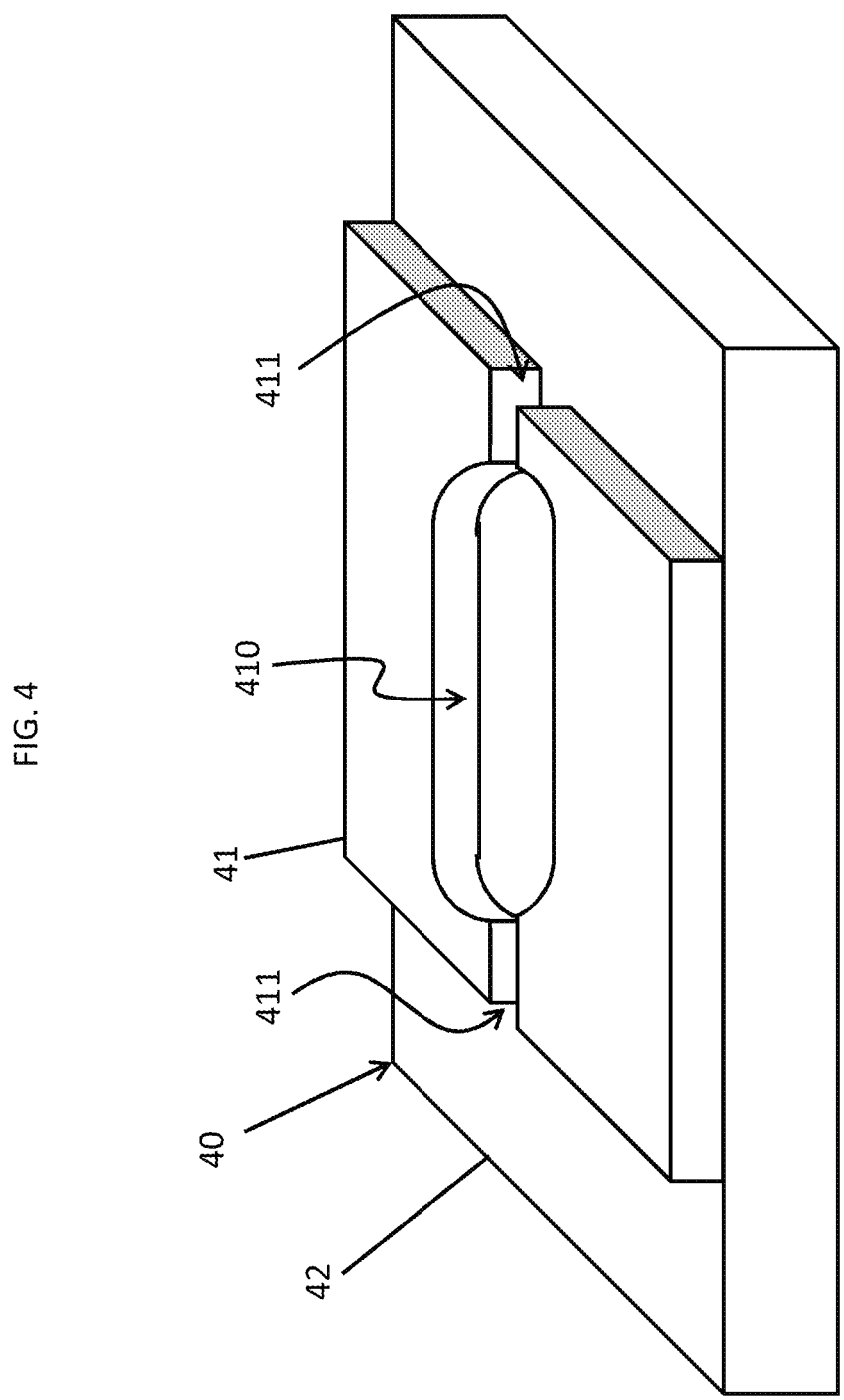
FIG. 4 is a perspective view of a tool use to form the filter of FIG. 1.

A method of forming the filter 10 will now be explained with reference to FIGS. 4 and 5. Initially, as shown in FIG. 4, a mold 40 is made from a top piece 41 and a bottom piece 42. Both the top piece 41 and the bottom piece 42 may be formed from Teflon™ or another similar non-stick material. The top piece 41 has opening 410 cut completely through it. This opening 410 may be rectangular or, more specifically, rectangular with rounded or semi-circular ends. Narrow slots 411 are cut in each end of the opening 410 that are at least as wide as the diameter of the coaxial cable 20 (the diameter of the coaxial cable 20 may be about 0.085 inches). The bottom piece 42 is formed as a substantially flat body of Teflon™ or another similar non-stick material. The top piece 41 is affixed (i.e., fastened or screwed) to the bottom piece 42. With this construction, the opening 410 is bordered by the cutout sidewalls of the top piece 41 and the top surface of the bottom piece 42. The shape of the cutout sidewalls of the top piece and the flatness (or lack thereof) of the surface of the bottom piece 42 will be determinative of the shape of the body 31 as described above.

The use of Teflon™ (or another similar non-stick material) facilitates the removal of the filter 10 form the mold 40 once the potting material 30 is cured as will be described below. Since the cured potting material 30 does not stick to the Teflon™, it should be possible to simply slide the filter 10 and the coaxial cable 20 out and away from the mold 40. Where the first and second angles 316 and 317 are formed as right angles, this sliding should be conducted along an axis oriented normally to the top surface of the bottom piece 42 (i.e., the "removal direction" of FIG. 2). However, in the case of the embodiments in which the first angles 316 are obtuse and the second angles 317 are correspondingly acute and vice versa, the sliding may be conducted at an angle with respect to the top surface of the bottom piece 42 (i.e., the "angled removal direction" of FIG. 2).

Figure 5:
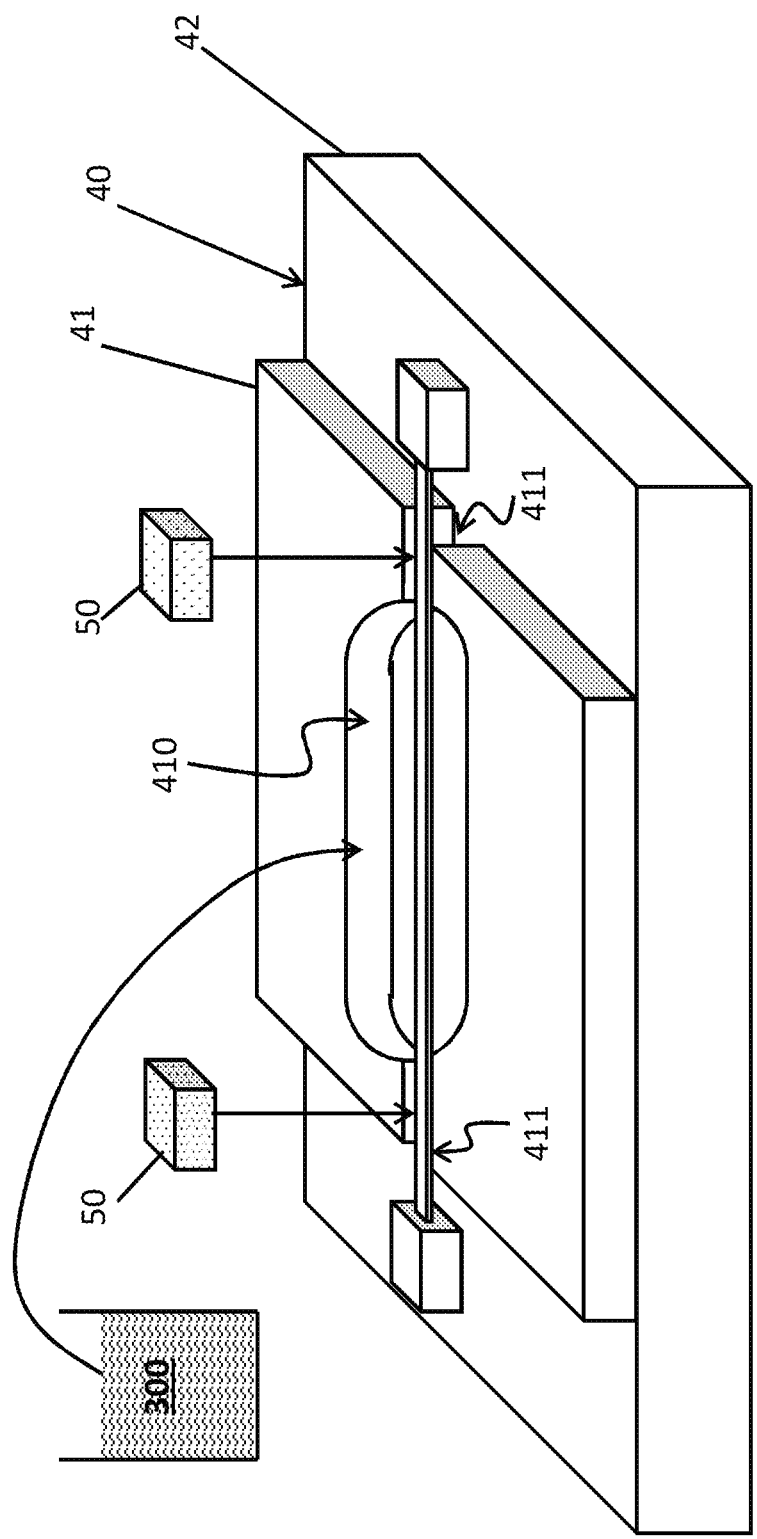
FIG. 5 is a perspective view of the tool of FIG. 3 in an initial stage of use.

As shown in FIG. 5, the coaxial cable 20 with the slits 24 (see FIG. 1) formed in the outer sheath 21 is inserted into the narrow slots 411 in the top piece 41 such that the coaxial cable 20 is suspended inside the opening 410. In accordance with embodiments, the height of the top piece 41 should be defined should such that the suspended cable is substantially centered in the opening 410. Sealant (such as a non-magnetic epoxy) 50 is then applied around the ends of the coaxial cable 20 where the coaxial cable 20 exits the opening 410 through the narrow slots 411.

The absorptive epoxy material 300 is then poured into the opening 410 and thereby fully encapsulates the coaxial cable 20 such that it contacts the dielectric spacer 23 via the slits 24. The absorptive epoxy material 300 is allowed to cure until solid. At this point, the filter 10 and the coaxial cable 20 are removed from the mold 40. Removal may be accomplished by simply pulling the filter 10 and the coaxial cable 20 outwardly or by separating the top and bottom pieces 41 and 42 of the mold 40 and pressing out the filter 10 from the opening 410 in either the removal direction of FIG. 2 or the angled removal direction of FIG. 2.

In accordance with embodiments, the slits 24 may be 1 mm in width and may have varying lengths. By adjusting the slit 24 lengths and the number of slits 24, properties of the filter 10, such as attenuation versus frequency, can be set to desired values. The slit 24 geometry determines the amount and frequency of radiation that escapes into the potting material 30. This radiation is then absorbed by the epoxy/ferromagnetic particle combination of the potting material 30 and leads to the observed behavior of the filter 10.

Figure 6:
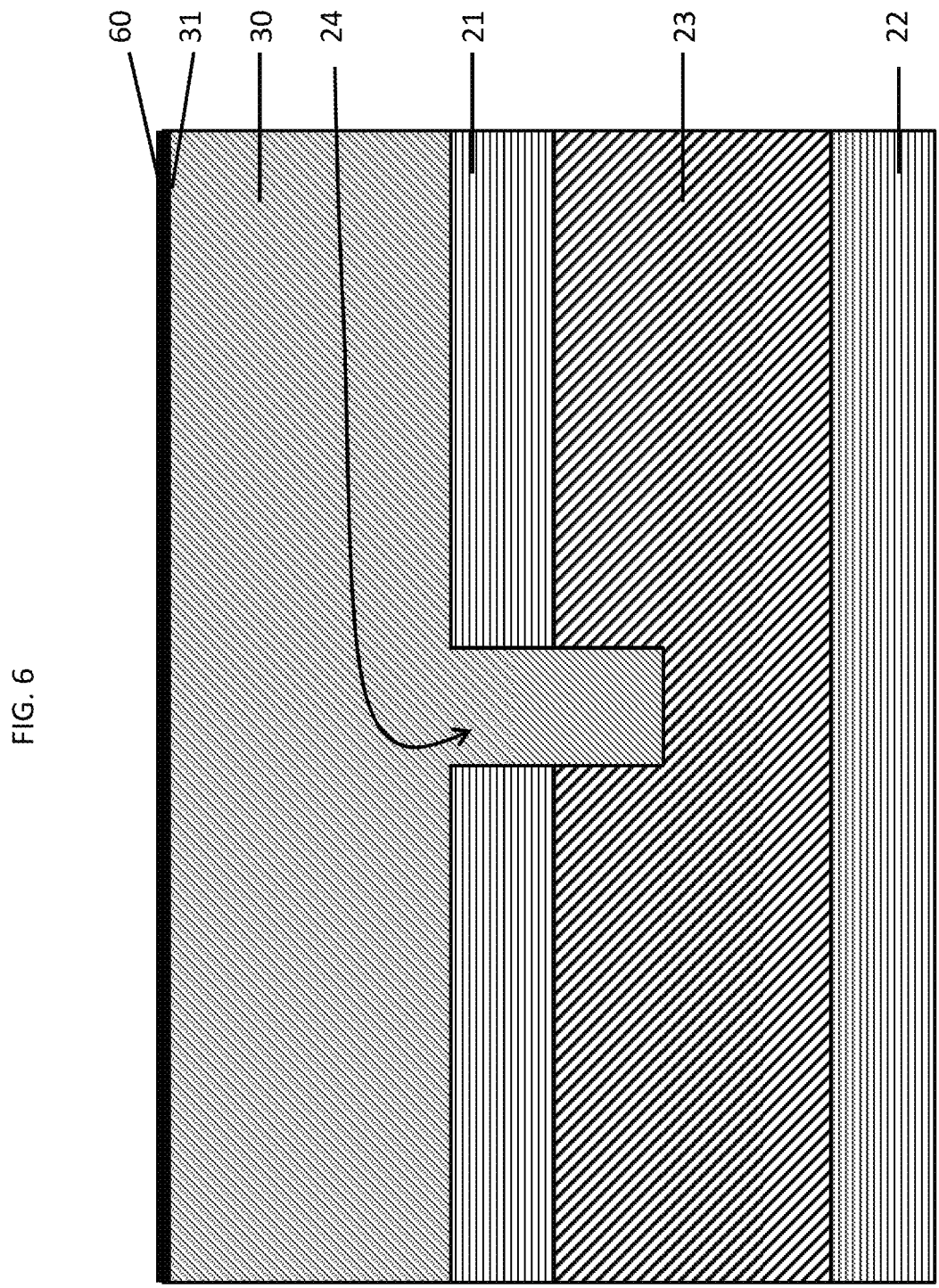
FIG. 6 is an enlarged partial side view of the filter of FIG. 1 in accordance with further embodiments.

As shown in FIG. 3, the formation of the one or more slits 24 may include the removal of only material of the outer sheath 21. In these cases, none of the dielectric spacer 23 is removed. However, in accordance with further embodiments and, with reference to FIG. 6, some of the dielectric spacer 23 may be removed along with the material of the outer sheath 21. As shown in FIG. 6, in these cases, a portion of the potting material 30 infiltrates the spacer that would otherwise be occupied by the removed dielectric spacer 23. In accordance with still further embodiments and, as shown in FIG. 6, once the filter 10 and the coaxial cable 20 are removed from the mold 40, an outer metallic cylinder 60 may be disposed about the filter 10 to retain the potting material 30 therein.

Figure 7:
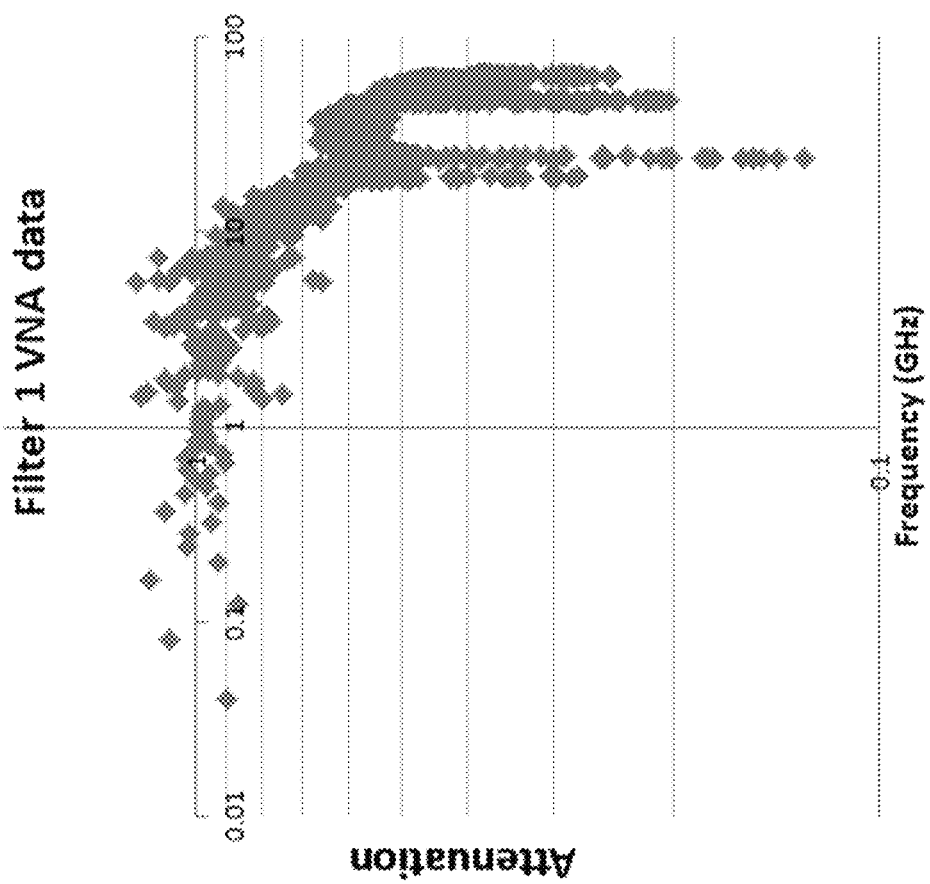
FIG. 7 is a graphical depiction of a performance of the filter of FIG. 1.
Figure 8:
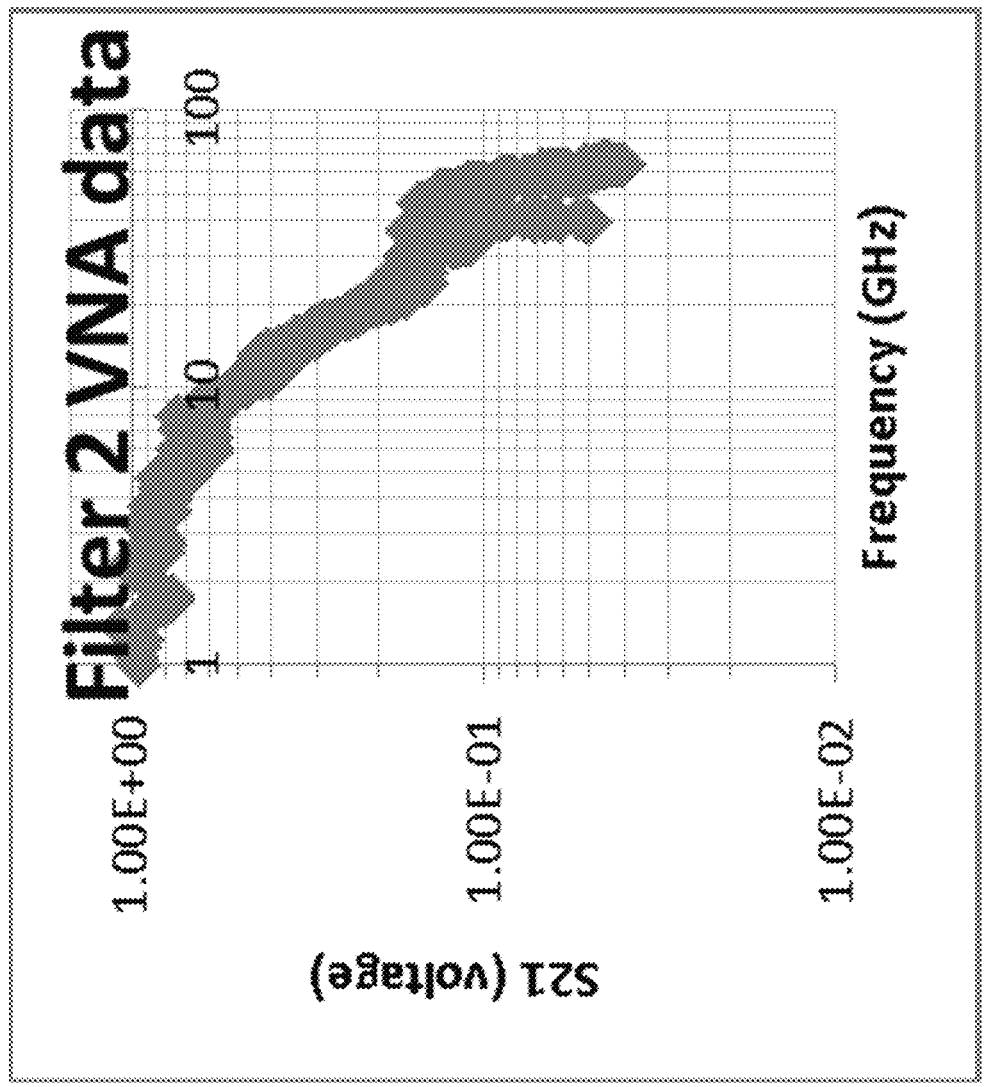
FIG. 8 is a graphical depiction of a performance of the filter of FIG. 1.

With reference to FIGS. 7 and 8, graphical depictions of performances of the filter 10 are illustrated. In FIG. 7, the filter 10 has 2 slits 24, which are 1 cm long and 1 mm wide. This filter 10 is operable for 3 dB at 12 GHz and provides a maximum attenuation of 5 dB 65 GHz. In FIG. 8, the filter 10 has 4 slits 24, that are 2.6 cm long and 1 mm wide. This filter 10 is operable for 3 dB at 6-7 GHz and provides a maximum attenuation of 15 dB 65 GHz.

It is to be understood that a parameter affecting performance of the filter 10 is whether or not any of the dielectric spacer 23 is removed when the slits 24 are formed. As noted above and, in accordance with embodiments, most if not all of the dielectric spacer 23 remains and only sections of the outer sheath 21 are removed to form the slits 24 (see FIG. 3). This geometry minimizes the impedance mismatch between the section of the coaxial cable 20 that is associated with the filter 10 and the other non-filtered sections of the coaxial cable 20. In accordance with alternative embodiments, however, at least some of the dielectric space 23 is removed in the formation of the slits 24. These embodiments may be particularly useful with a fixed size slit 24 where a relatively large impedance mismatch is acceptable (see FIG. 6).

In accordance with further aspects and, with reference to FIG. 1, a circuit 100 is provided. The circuit employs the filtered coaxial cable 20 as described above with the filtered coaxial cable 20 being disposed in a low-temperature measurement apparatus 110 at various periods in the cooling stages. In this way, the filter 10 serves to attenuate unwanted high frequency noise signals. In accordance with embodiments, a design corner frequency may be in the range of about 2-20 GHz, and the attenuation would be adjusted by choice of Eccosorb™ materials, slit 24 lengths and widths and the number of slits 24 in order to achieve the desired reduction in noise at any given frequency.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of assembling a filter for a coaxial cable with a conductive outer sheath, an inner conductor and dielectric spacer material interposed between the conductive outer sheath and the inner conductor, the method comprising:
    forming slits in the conductive outer sheath of a portion of the coaxial cable;
    assembling a mold with top and bottom pieces, the top piece having an opening and slots at opposite ends of the opening;
    inserting the coaxial cable into the slots to suspend the portion of the coaxial cable with the slits in the opening;
    forming potting material into a body thereby providing the filter, defining a through-hole about the portion of the coaxial cable in the opening such that the potting material contacts the dielectric spacer material via the slits, the body comprising first and second opposing faces and a sidewall extending between the first and second opposing faces; and
    defining in the sidewall:
    first and second openings at opposite ends of the through-hole, first angles at an interface between the sidewall and the first face, and
    second angles, which complement the first angles, at an interface between the sidewall and the second face.

2. The method according to claim 1, wherein the potting material comprises an absorptive epoxy and ferromagnetic particles.

3. The method according to claim 2, wherein the forming of the potting material comprises pouring the absorptive epoxy with the ferromagnetic particles.

4. A method of assembling a filter for a coaxial cable with a conductive outer sheath, an inner conductor and dielectric spacer material interposed between the conductive outer sheath and the inner conductor, the method comprising:
    forming slits in the conductive outer sheath of a portion of the coaxial cable;
    assembling a mold with top and bottom pieces, the top piece having an opening and slots at opposite ends of the opening;

inserting the coaxial cable into the slots to suspend the portion of the coaxial cable with the slits in the opening; and forming potting material into a body thereby providing the filter, defining a through-hole about the portion of the coaxial cable in the opening such that the potting material contacts the dielectric spacer material via the slits, wherein:

the body has first and second opposing faces and a sidewall extending between the first and second opposing faces, and wherein the forming comprises defining, in the sidewall, first and second openings at opposite ends of the through-hole, first angles at an interface between the sidewall and the first face and second angles complementing the first angles at an interface between the sidewall and the second face.

5. The method according to claim 4, wherein the potting material comprises an absorptive epoxy and ferromagnetic particles.

6. The method according to claim 5, wherein the forming of the potting material comprises pouring the absorptive epoxy with the ferromagnetic particles.

7. The method according to claim 1, further comprising adjusting a number of the slits and a length of each of the slits to achieve desired filter properties.

8. The method according to claim 1, wherein the forming of the slits in the conductive outer sheath of the portion of the coaxial cable comprises removing only material of the conductive outer sheath and none of the dielectric spacer material.

9. The method according to claim 1, wherein:

the forming of the slits in the conductive outer sheath of the portion of the coaxial cable comprises removing material of the conductive outer sheath and a quantity of the dielectric spacer material, and the forming of the potting material into the body comprises infiltrating space formerly occupied by the removed quantity of the dielectric spacer material with the potting material.

10. The method according to claim 1, further comprising disposing an outer metallic element about the body.

11. The method according to claim 4, further comprising adjusting a number of the slits and a length of each of the slits to achieve desired filter properties.

12. The method according to claim 4, wherein the forming of the slits in the conductive outer sheath of the portion of the coaxial cable comprises removing only material of the conductive outer sheath and none of the dielectric spacer material.

13. The method according to claim 4, wherein:

the forming of the slits in the conductive outer sheath of the portion of the coaxial cable comprises removing material of the conductive outer sheath and a quantity of the dielectric spacer material, and the forming of the potting material into the body comprises infiltrating space formerly occupied by the removed quantity of the dielectric spacer material with the potting material.

14. The method according to claim 4, further comprising disposing an outer metallic element about the body.

15. A method of assembling a filter for a coaxial cable with a conductive outer sheath, an inner conductor and dielectric spacer material interposed between the conductive outer sheath and the inner conductor, the method comprising:

forming slits in the conductive outer sheath of the coaxial cable;

assembling a mold having an opening and slots at opposite ends of the opening;

inserting the coaxial cable into the slots to suspend a portion of the coaxial cable with the slits in the opening; and forming potting material into a body about the portion of the coaxial cable in the opening thereby providing the filter, such that the potting material contacts the dielectric spacer material via the slits.

16. The method according to claim 15, further comprising adjusting a number of the slits and a length of each of the slits to achieve desired filter properties.

17. The method according to claim 15, wherein the forming of the slits in the conductive outer sheath of the coaxial cable comprises removing only material of the conductive outer sheath and none of the dielectric spacer material.

18. The method according to claim 15, wherein:

the forming of the slits in the conductive outer sheath of the portion of the coaxial cable comprises removing material of the conductive outer sheath and a quantity of the dielectric spacer material, and the forming of the potting material into the body comprises infiltrating space formerly occupied by the removed quantity of the dielectric spacer material with the potting material.

19. The method according to claim 15, further comprising disposing an outer metallic element about the body.

* * * * *